Nov. 15, 1966  W. N. HOLMQUIST  3,285,542
PITCH-STABILIZED, VARYING-SWEEP WING
Filed Jan. 15, 1965  3 Sheets-Sheet 3

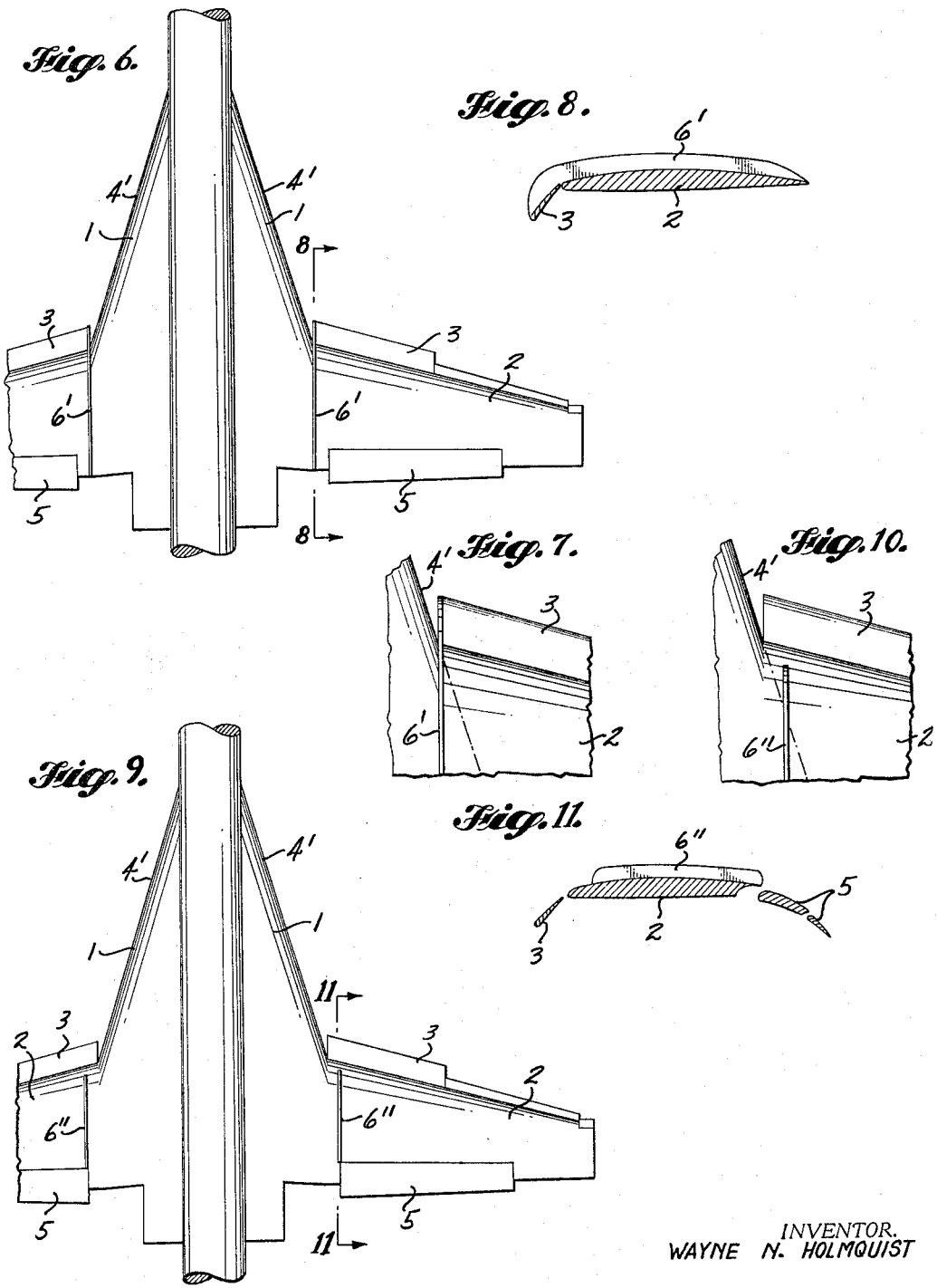

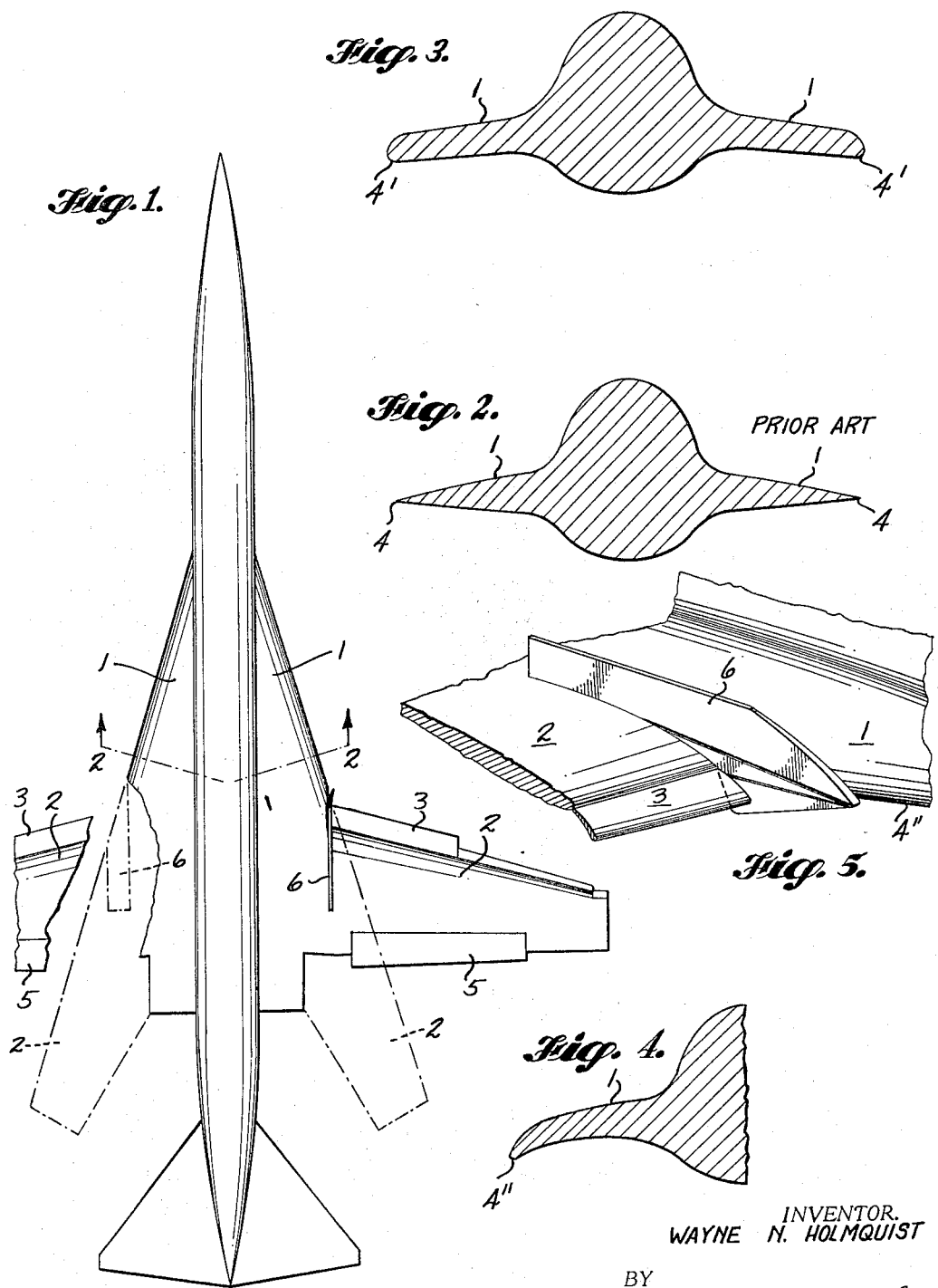

INVENTOR.
WAYNE N. HOLMQUIST

BY
Robert W. Beach
ATTORNEY

United States Patent Office 3,285,542
Patented Nov. 15, 1966

3,285,542
PITCH-STABILIZED, VARYING-SWEEP WING
Wayne N. Holmquist, Seattle, Wash., assignor to The Boeing Company, Seattle, Wash., a corporation of Delaware
Filed Jan. 15, 1965, Ser. No. 425,884
8 Claims. (Cl. 244—91)

This invention relates to a wing construction of the varying-sweep type, which is stabilized against upsetting pitching at low speeds.

In supersonic airplanes the trend has been increasingly toward the use of high-sweep wings. Such wings reduce the adverse effect of shock waves on them. It is still necessary for such airplanes to fly at relatively low speeds during takeoff and landing. Moreover, various expedients are employed to obtain landing speeds as slow as possible, despite the desire for the wings to have high sweep and small area at supersonic speeds.

An expedient employed to reduce the landing speed of a supersonic airplane is to utilize a wing having variable sweep, or at least having an inboard portion, or panel, with a high-sweep leading edge and an outboard portion, or panel, with a relatively low-sweep leading edge. The outboard portion, or panel, of such a wing usually has lift-increasing devices in the form of flaps, which frequently are provided on both the leading edge and the trailing edge of such outboard wing portion.

In utilizing planform cranked wings having varying-sweep leading edges including a high-sweep inboard portion and a relatively low-sweep outboard portion with sharp leading edges, it has been found that undesirable nose-up moments have been produced at high angle of attack attitude during landing. Such nose-up moments produce unstable flight characteristics which are very difficult for the pilot to overcome. It will be appreciated that the stalling tendency of the airplane thus created occurs at a very critical time in the operation of the airplane, namely, during the process of landing, when it is necessary for the pilot to give his attention to communication with the airport, avoidance of other aircraft maneuvering in the landing pattern or which are taking off, adjustment of flaps for increased lift, manipulation of power and trim controls and operation of landing gear projecting mechanism. For the pilot to be bothered to manipulate the flight controls to overcome a stalling tendency of the airplane at such a time is highly undesirable.

The principal object of the present invention, therefore, is to provide pitch stability for such a supersonic airplane having wings with varying sweep leading edges when flying at low speeds, such as during takeoff and landing maneuvers.

A further object is to provide an airplane wing design which will not only be stable in pitching, but which will be more efficient, having a higher lift-drag ratio and preferably, also, higher lift characteristics during relatively low speed flight, yet which will be reasonably effective during supersonic flight.

It is also an object to provide a wing having such advantageous flight characteristics which will be simple and rugged in construction, and will not present complicated manufacturing problems. In particular, it is an object to accomplish the desired beneficial aerodynamic results without requiring additional moving parts to be incorporated in the wing structure, although the wing construction utilized may involve moving parts, if desired.

It has been found that the aforementioned objects can be accomplished to a considerable extent by making the high-sweep portion of a platform cranked wing's leading edge of blunt contour, that is, rounded or cambered shape, and the aforementioned objects can be accomplished to a greater extent by providing a fence in the region of transition between the inboard high-sweep portion of the wing's leading edge and the outboard low-sweep portion of the wing's leading edge.

FIGURE 1 is a plan of a supersonic aircraft having variable sweep wings incorporating the present invention. FIGURE 2 is a somewhat diagrammatic cross section on line 2—2 of FIGURE 1, showing a conventional high-sweep wing sharp leading edge, FIGURE 3 is a similar section of one type of blunt leading edge profile, of rounded character, in accordance with the present invention, and FIGURE 4 is a similar section of another type of blunt leading edge profile of rounded and cambered character. FIGURE 5 is a top perspective of a portion of such structure.

FIGURE 6 is a plan of an airplane generally of the type shown in FIGURE 1, with parts broken away, equipped with a somewhat modified structure of the present invention, and FIGURE 7 is an enlarged fragmentary detail plan of a portion of such structure. FIGURE 8 is a section through the wing of FIGURE 6 taken on line 8—8 of that figure.

FIGURE 9 is a plan of an airplane similar to that shown in FIGURE 6, with a somewhat modified type of pitch-stabilizing structure, and FIGURE 10 is an enlarged fragmentary detail plan of a portion of such structure. FIGURE 11 is a section through the wing of the airplane shown in FIGURE 9 taken on line 11—11 of that figure.

Figure 14:
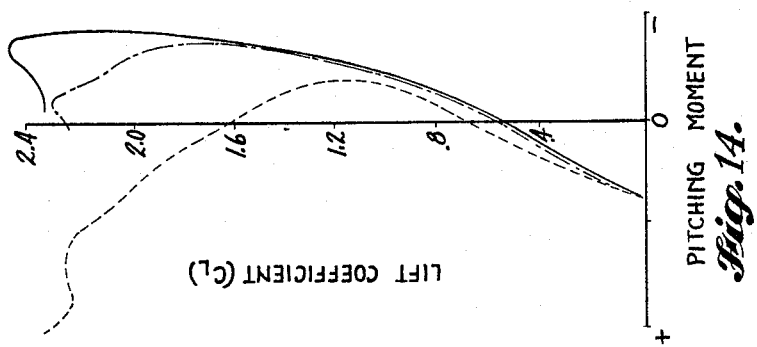
FIGURES 12, 13 and 14 are graphs showing curves illustrating characteristics of an airplane such as shown in FIGURES 9 to 11 obtained by use of the present invention.

While the present invention could be used effectively on any planform cranked wing airplane, the wings of which have inboard portions with leading edges of relatively high sweep and outboard portions with leading edges of relatively low sweep, or for an airplane having a double-delta wing, the invention is illustrated in the drawings and described as being applied to a wing having variable sweep. Thus, as illustrated in FIGURE 1, the inboard wing panels 1 having leading edges with a sweep of approximately 75 degrees. The outboard wing panels 2 are mounted pivotally on the inboard wing panels to swing from the broken line positions in which their leading edges are substantially in alignment with the leading edges of the wing panels 1 into the solid line positions in which their leading edges have relatively low sweep, such as approximately 15 degrees, so that the wing panels 2 pivot through an angle of approximately 60 degrees between their high-sweep and low-sweep positions.

The effect of the present invention is important for use on supersonic airplanes when they are flying at relatively slow speed, such as during takeoff and particularly during a landing approach. Under such flight conditions a variable-sweep wing will be in its condition illustrated in the drawings with its outer wing panel in the forward position shown in FIGURES 1, 6 and 9, and with leading edge flaps 3 and trailing edge flaps 5 depressed or extended, depending upon the type of flap provided. Also, while the present invention is most effective where the high-sweep inboard leading edge portion has a sweep angle exceeding 45 degrees, and the relatively low-sweep outboard leading edge portion has a sweep angle of less than 45 degrees, such latter angle is not necessary to obtain benefit from the present invention as long as there is a substantial difference in the sweep angle of the inboard leading edge portion and the outboard leading edge portion. Also, it is not necessary that the transition from a high-sweep leading edge to a low-sweep leading edge occur as an abrupt break, although the invention will probably be applied most frequently to wings having leading edges of that type.

When a variable-sweep wing airplane is approaching a landing field to land the outboard wing panel 2 will be swung fully forward from the broken-line position of FIGURE 1 into the solid-line position of FIGURES 1, 6 and 9, and the flaps 3 and 5 will be swung downward or extended, as shown in FIGURES 8 and 11, in the last stages of the landing procedure. The wings will thus be in their high lift configuration so that the airplane speed for landing can be reduced as much as possible. The lift afforded by the wing can also be increased so that the speed of the airplane can be reduced further by increasing the angle of attack of the wings toward the stalling angle, or angle of maximum lift. Since an airplane wing stalls rather abruptly beyond the angle of maximum lift, resulting in a rapid decrease in lift and increase in drag, it is important that the angle of attack of the airplane not be increased so close to the angle of maximum lift as to risk occurrence of a stall as the airplane maneuvers during the landing approach.

If the positive angle of pitch of the airplane should be increased beyond the stalling angle of the wing when the airplane is in horizontal or descending flight the airplane would lose considerable altitude because the increased drag would prevent the airplane from being accelerated sufficiently rapidly to regain the lift required to maintain level flight. Unless the airplane was quite close to the ground, therefore, ready for touchdown, the airplane could crash. Consequently, it is vital to maintain the angle of attack of the airplane well below the stalling angle of the wing at all times during the landing approach.

While, for the reasons stated above, it is necessary to prevent the angle of attack of the wing from increasing to the stalling angle, it is also very desirable to be able to increase the angle of attack gradually to a value near the maximum lift angle during landing so that the landing speed of the airplane can be low. To effect such a maneuver it is desirable for the production of an increasing positive or nose-up pitching moment to require an increasing negative elevator angle. To manipulate the elevator in this fashion the control column is gradually swung rearwardly. If, however, as the angle of attack of the airplane is increased the nose-up moment also increases automatically without the elevator being swung farther upward, a condition of static instability occurs, which would require the pilot to reverse the movement of the control column to swing it down in order to prevent the occurrence of a decrease in negative pitching moment or the production of a positive pitching moment.

It has been found that an airplane having a wing with a planform cranked leading edge in which the sweep angle of the inboard portion of the leading edge exceeds 45 degrees may be unstable in this respect. As the angle of attack increases it has been found that a strong vortex flow may be produced over the upper surface of the high-sweep leading edge wing portion at a location forward of the normal center of pressure of the airfoil, improving lift. As the angle of attack increases the wing lift produced by such vortex increases, or the center of pressure moves farther forward, or both, so that the pitching moment produced on the airplane decreases if negative or increases if positive. To prevent the angle of attack from increasing to the stall angle under such circumstances, therefore, it is necessary for the pilot increasingly to reverse the movement of the control column for depressing the elevators to balance the nose-up moment thus automatically produced.

It has been found that the present invention will alter the wing lift characteristics so that at high angles of attack not only can the production of a positive pitching moment be avoided, but the automatic production of any nose-up moment can be governed so that increase in angle attack of the airplane products a corresponding change in moment, or in some cases a gradually increasingly negative moment. Moreover, such increase in negative moment with increase in angle of attack can be substantially constant so that any corrective rearward swinging of the control column required by the pilot, and consequent increase in the negative elevator angle, in order to increase the angle of attack of the airplane, will be progressive. Such flying characteristics are extremely desirable.

To accomplish this result the high-sweep leading edge of the inboard wing panel is provided with a blunt and rounded leading edge, instead of a sharp leading edge such as the leading edge 4 as shown in FIGURE 2, and a fence is provided on the wing in the region of transition of the leading edge from high sweep to low sweep.

In this combination various types of blunt and rounded leading edge structures can be used and it is intended that such term be interpreted to cover variations such as a drooping rounded leading edge 4' as shown in FIGURE 3, a bulb leading edge protruding downward, or a hooked or drooped leading edge 4" having positive camber as shown in FIGURE 4. Moreover, such leading edge can be fixed, or variable. In the latter case the leading edge can be formed, for example, as a slat, or a droop flap, or other type of flap. Such a movable surface can be controlled automatically for movement, or can be moved manually. Also, in some instances the extent and/or contour of the blunt leading edge along the wing's leading edge may vary. It is preferred that the leading edge be of substantially constant cross section along the entire high-sweep portion of the leading edge, but beneficial results may be obtained even if the blunt leading edge does not extend fully to each end of the high-sweep portion of the leading edge. Also, in some instances the leading edge may taper in one direction or the other from a blunt leading edge to a sharp leading edge.

The type of fence used in the combination of blunt wing leading edge and fence can also vary. A preferred type of fence installation is shown in FIGURES 1 and 5. When the outboard wing panel 2 is in the broken-line position of FIGURE 1, the fence 6 may, for the most part, overlie the upper surface of the wing. Upper and lower vanes can be swung, respectively, upward and downward into the position shown in FIGURE 5 so that the leading end of the fence in raised position projects forward beyond the leading edge of the low-sweep wing portion, as shown in FIGURES 1 and 5. The lower vane of the fence may terminate rearwardly approximately at the leading edge of the outboard wing panel 2. In this combination the leading edge of the high-sweep inboard wing panel could be of the rounded, positively-cambered, hooked shape shown in FIGURE 4, although alternatively a rounded leading edge as shown in FIGURE 3, may be used with this type of fence.

The alternative type of fence 6' shown in FIGURES 6, 7 and 8, has a leading end which projects forward of the leading edge of the low-sweep outboard wing portion and alongside the leading edge of the high-sweep inboard wing portion. Projection of the fence this far forward may, however, be undesirable from a structural point of view, or may interfere with the leading edge flap installation. Consequently, it may be preferable for the leading end of the fence to stop short of the leading edge of the wing, as the fence 6" is shown in FIGURES 9, 10 and 11. In this case, however, the fence is located somewhat outboard from the inboard end of the leading edge of the low-sweep wing panel, so that the leading end of the fence extends forward of the intresection of the high-sweep leading edge line and the line of the fence.

Tests have indicated that the benefits of the present invention can be obtained by combining any of a variety of blunt and rounded leading edge contours on the high-sweep wing portion with any of a variety of wing fence types. Thus, for example, either of the blunt leading edges shown in FIGURES 3 and 4 could be combined with any of the types of fence shown in FIGURES 5, 8 and 11. Best results are obtained however, if the blunt and rounded leading edge of the wing's high-sweep portion has a curvature of considerable radius, as shown in both of FIGURES 3 and 4.

The combination of a blunt and rounded leading edge on the high-sweep inboard portion of the wing and a fence such as discussed above not only stabilizes the pitching of an airplane having a wing with a cranked leading edge but the lift-drag ratio is improved, providing a more efficient wing. Also, the lift itself may be higher for a wing having such a blunt leading edge and fence combination. It is believed that such lift and lift-drag improvement is at least partially the result of the action of the fence in deterring spanwise migration of the vortex from the upper surface of the inboard wing panel over the upper surface of the outboard wing panel, which could disturb the airflow over the upper surface of the higher lift, lower sweep wing portion.

Figure 12:
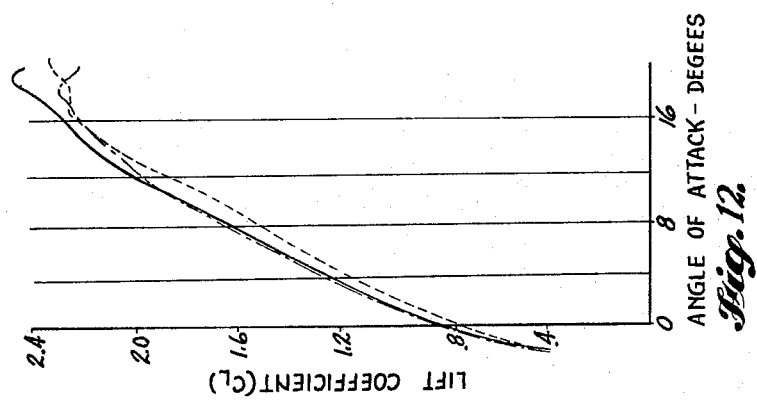
Figure 13:
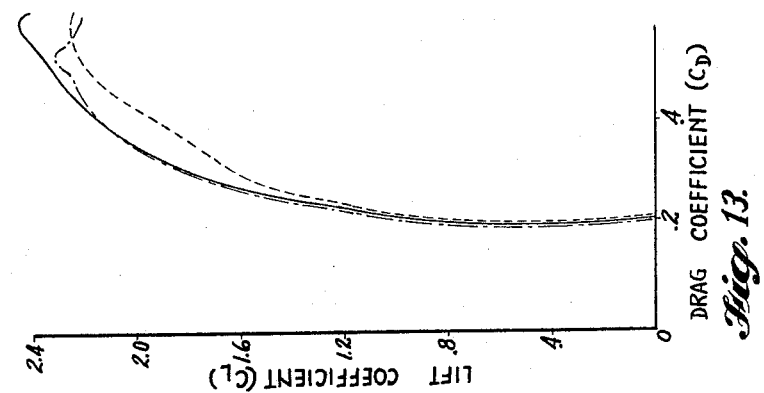

The improvement in airplane performance obtained by the use of the present invention is illustrated by the aerodynamic curves shown in FIGURES 12, 13 and 14. In each of these figures the dotted-line curve designates a characteristic of the wing arrangements shown in FIGURES 1, 6 and 9, with a sharp leading edge, as shown in FIGURE 2, and without any fence. In each of these figures the dot-dash line represents a characteristic of the wing shown in FIGURES 1, 6 and 9, having a blunt and rounded leading edge of the type shown in FIGURE 3, but without a fence. The solid line curve in each of FIGURES 12, 13 and 14 illustrates a characteristic of an airplane having a wing with a blunt and rounded leading edge on the high-sweep portion of the type shown in FIGURE 3 and with a fence of the type shown in FIGURES 9, 10 and 11. Such curves are, however, typical of the performance which is obtained by the combination of a blunt and rounded leading edge such as shown in either FIGURE 3 or 4 with a fence such as shown in either FIGURE 5, FIGURE 8 or FIGURE 11.

The curves of FIGURE 12 show the relationship between the angle of attack of the airplane and the lift coefficient of the wings, indicating that the stalling angle of the three wing configuration is approximately the same. At the stalling angle, however, the sharp leading edge wing without a fence does not lose an appreciable amount of lift, but a break occurs in the curve and the wing lift thereafter increases as the result of the vortex flow over the upper surface of the wing, as discussed above. Instead of stalling the lift characteristics simply become nonuniform at angles of attack above about 17 degrees. While the stall is sharper for the blunt and rounded leading edge wing and the blunt and rounded leading edge and fence combination, the stall is postponed to about 18 degrees angle of attack and the lift coefficient resulting from the blunt and rounded leading edge and fence combination actually is appreciably higher than for the wing with a blunt and rounded leading edge alone, or with a sharp leading edge. Moreover, the lift curve is more nearly linear.

FIGURE 13 shows a set of lift-drag curves for the sharp leading edge wing, for the blunt and rounded leading edge wing and for the wing of the present invention having a combination of blunt and rounded leading edge and fence. From these curves it is evident that, at higher angles of attack, for a given lift coefficient the drag coefficient of the sharp leading edge wing is substantially greater than the drag coefficient for the blunt and rounded leading edge wing, or for the combination of the blunt and rounded leading edge wing and the fence. Consequently, the wing with the blunt and rounded leading edge is more efficient at high angles of attack than the wing with a sharp leading edge. Also a comparison of the solid-line curve of the blunt and rounded leading edge and fence combination with the dot-dash curve for a wing with a blunt and rounded leading edge only shows that at high lift angles of attack the lift produced by the wing having the combination is greater than that produced by the blunt and rounded leading edge wing only for a selected drag coefficient; thus showing that the wing having the blunt and rounded leading edge and fence combination is more efficient at high angles of attack and the stalling speed is lower.

While it is desirable to use a wing having a higher lift coefficient and a higher lift-drag ratio, if such a wing configuration has no disadvantages, the most important consideration, as far as the present invention is concerned, is the effect of the blunt and rounded leading edge and fence combination on the airplane-pitching moment, as represented by the curves of FIGURE 14. It is evident from the dotted curve of this figure that the pitching-moment curve begins to depart from the linear direction of the curve at an angle of attack of about 2 degrees, and that above such angle the negative, or nose-down, moment decreases until, at an angle above about 9 degrees, the pitching moment produced actually becomes positive so that at higher angles of attack the airplane is unstable in the pitching sense.

As has been mentioned above, the effect of such a change in moment is first to reduce the negative elevator angle required to maintain the airplane attitude at a given angle of attack and, as the angle of attack increases, it will finally actually be necessary to move the elevator in the positive direction in order to prevent a further increase in angle of attack of the airplane. The requirement for such a reversal of control movement of the control column by the pilot is highly objectionable. Linearity of the pitching moment curve continues to a substantially higher angle of attack if the blunt and rounded leading edge alone is used, as indicated by the dot-dash curve in FIGURE 12. In this instance such linearity persists with increasing angles of attack up to 9 or 10 degrees, beyond which angle of attack the control force produced by manipulation of the elevators to maintain a given angle of atack must be reduced.

Virtually the ideal pitching moment conditions are represented by the solid-line curve of FIGURE 12. This curve shows that the pitching moment increases gradually up to an angle of attack of approximately 16 degrees, and even at higher angles of attack the control moment requirements are not reduced appreciably. Actually, it is desirable to have the slope of the pitching moment curve be of constant slope throughout the flight range but the slope of the solid line curve of FIGURE 12 is sufficiently uniform to be acceptable. In the normal operation of landing the pilot will not be required to move the control column forward, or even reduce the force applied to the control column appreciably, in landing approaches, in order to overcome the adverse effects of a nose-up moment which has occurred automatically as a result of wing characteristics.

I claim as my invention:
1. In an airplane, a planform-cranked wing including an inboard portion having a relatively high-sweep leading edge and an outboard portion having a relatively low-sweep leading edge, the leading edge of said inboard portion being blunt and rounded, and a fence on the upper surface of said wing substantially at the region of transition between the high-sweep leading edge inboard portion and the low-sweep leading edge outboard portion.
2. The wing defined in claim 1, in which the fence extends forward at least substantially to the portion of the leading edge of the wing at the location of the fence.
3. The wing defined in claim 2, in which the fence extends forward beyond the portion of the leading edge of the wing at the location of the fence.
4. The wing defined in claim 1, in which the leading edge is blunt and rounded over at least the major portion of the length of its inboard high-sweep portion.
5. The wing defined in claim 1, in which the leading edge is blunt and rounded along its high-sweep inboard portion rearwardly substantially to the region of transition between such portion and its low-sweep leading edge outboard portion.

6. The wing defined in claim 1, in which the leading edge of the wing has an abrupt break between its high-sweep inboard portion and its low-sweep outboard portion.

7. In an airplane, a planform-cranked wing including an inboard panel having a relatively high-sweep leading edge and an outboard panel having a relatively low-sweep leading edge, the leading edge of said inboard panel being blunt and rounded, and a fence at the transition break between the high-sweep leading edge of said inboard panel and the low-sweep leading edge of said outboard panel.

8. In the wing defined in claim 7, the fence having its forward end extending forward of the intersection of the high-sweep leading edge line of the inboard panel and the line of said fence.

References Cited by the Examiner
UNITED STATES PATENTS

Re. 25,418  7/1963  Grant _____ 244—91
3,064,928  11/1962  Toll _____ 244—43 X

OTHER REFERENCES

Aeronautical Engineering, June 24, 1957, pages 52 and 53 by J. S. Butz, Jr.

MILTON BUCHLER, *Primary Examiner.*

ANDREW H. FARRELL, *Examiner.*